No. 856,153. PATENTED JUNE 4, 1907.
A. A. HUGHES.
LANDSIDE.
APPLICATION FILED AUG. 13, 1906.
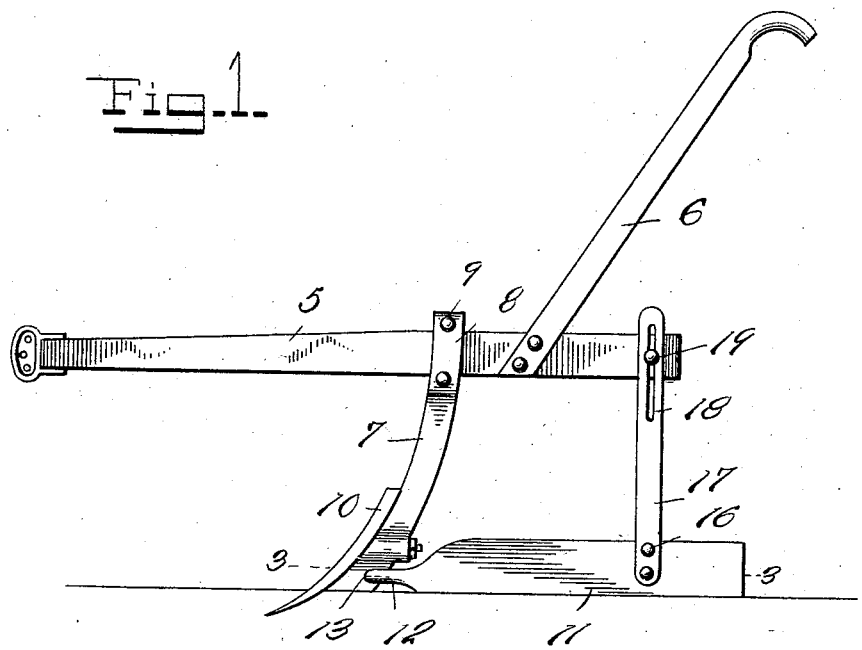
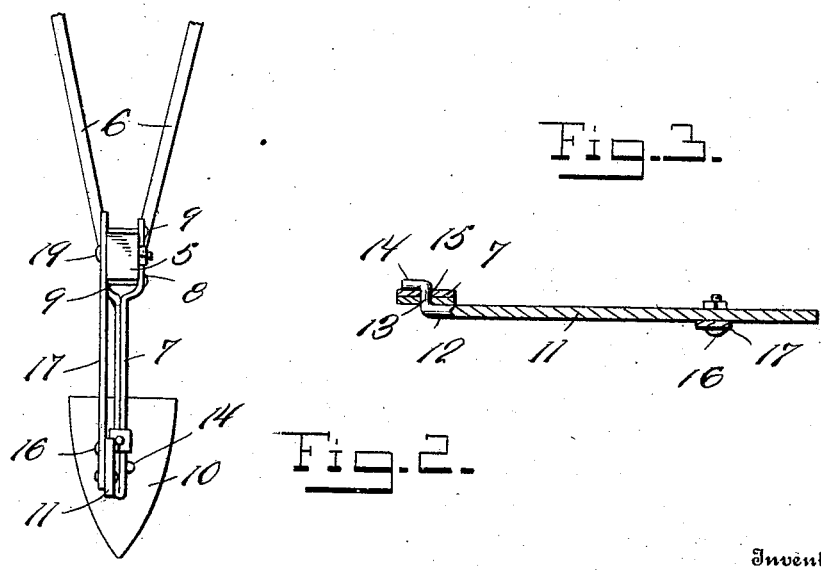
Witnesses
G. R. Thomas
H. G. Smith
Inventor
A. A. Hughes
By
Attorneys

UNITED STATES PATENT OFFICE.

ALEXANDER A. HUGHES, OF GUNN, MISSISSIPPI, ASSIGNOR OF ONE-HALF TO T. J. WALKER, OF MAGEE, MISSISSIPPI.

LANDSIDE.

No. 856,153.      Specification of Letters Patent.      Patented June 4, 1907.

Application filed August 13, 1906. Serial No. 330,359.

*To all whom it may concern:*

Be it known that I, ALEXANDER A. HUGHES, a citizen of the United States, residing at Gunn, in the county of Smith, State of Mississippi, have invented certain new and useful Improvements in Landsides; and I do hereby declare the following to be a full, clear, and exact description of the invention, such as will enable others skilled in the art to which it appertains to make and use the same.

This invention relates to plows and more particularly to land sides therefor and it is the object of the invention to provide a land side of such construction that it may be readily attached or detached to and from an ordinary form of plow, the land side being held in place by but a single bolt.

Heretofore much inconvenience has been experienced in attaching and detaching land sides from plows by reason of the fact that they are bolted at both ends to the plow and hence it is the object of my invention to provide a land side which may be detached from the plow by simply removing the single bolt which holds it in place. In order to attain this object the forward end of the land side is reduced laterally and thence forwardly so that it may be pivotally engaged through an opening formed at the lower end of the plow standard, the rear end of the land side being bolted to a standard which is detachably connected with the plow beam.

In the accompanying drawings, Figure 1 is a side elevation of a plow showing the manner of attaching my land side thereto. Fig. 2 is a rear elevation thereof, and Fig. 3 is a detail horizontal sectional view on the line 3—3 of Fig. 1.

Referring more specifically to the drawings the numeral 5 denotes the beam of a plow and 6 the handles thereof.

The plow standard is indicated by the numeral 7 and is provided at its upper end with the usual beam receiving yoke 8 through the spaced portion of which are engaged bolts 9 which lie above and below the beam and serves to hold the standard thereupon, there being the usual plow shovel 10 located at the lower end of the standard.

The land side comprises a bar or bolt 11 which is reduced at its forward end to form a stem 12 which is bent laterally as at 13 and thence forward as at 14, the said bent portion 13 of the stem being engaged through an opening 15 adjacent the lower end of the standard 7, it being understood that the land side is thus pivotally connected with the standard 7. The land side 11 is pivoted as at 16 adjacent its rear end to a standard 17 which is slotted as at 18 for engagement therethrough of a bolt 19 which also passes through the beam 5 of the plow adjacent the rear end thereof, it being understood that by this means the land side may be adjusted vertically at its rear end to regulate the depth of cut of the plow shovel 10.

From the foregoing it will be seen that by removing the bolt 16, the land side may be readily detached from the plow standard 7 either for repair, substitution or renewal.

It is to be understood that I do not desire to be limited to the exact details of construction shown and described, for obvious modifications will occur to a person skilled in the art.

What is claimed is:—

1. In a device of the class described, the combination with a plow beam and a standard secured to the beam and provided adjacent its lower end with an opening, of a standard adjustably carried by the beam, and a land side having a reduced end engaged through the opening in the plow standard and pivoted to the lower end of the adjustable standard.

2. In a device of the class described the combination with a plow beam and its standard, of a standard adjustably carried by the beam, and a landside pivotally connected with the adjustable standard and having one of its ends reduced and turned laterally and engaged through an opening in the plow standard.

In testimony whereof, I affix my signature, in presence of two witnesses.

ALEX. A. HUGHES.

Witnesses:
     C. F. DUKES,
     R. H. DUKES